(12) United States Patent
Nakai et al.

(10) Patent No.: US 7,313,265 B2
(45) Date of Patent: Dec. 25, 2007

(54) STEREO CALIBRATION APPARATUS AND STEREO IMAGE MONITORING APPARATUS USING THE SAME

(75) Inventors: Hiroaki Nakai, Kanagawa (JP); Masayuki Maruyama, Kanagawa (JP); Duangmanee Putthividhya, San Diego, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 704 days.

(21) Appl. No.: 10/798,383

(22) Filed: Mar. 12, 2004

(65) Prior Publication Data

US 2004/0234124 A1    Nov. 25, 2004

(30) Foreign Application Priority Data

Mar. 13, 2003   (JP) ............................ P2003-068835
Jun. 10, 2003   (JP) ............................ P2003-165757

(51) Int. Cl.
*G06K 9/00* (2006.01)
(52) U.S. Cl. ...................... 382/154; 382/104
(58) Field of Classification Search ........ 382/103–107, 382/154, 190, 199, 209, 266, 269; 348/42–47, 348/143, 148, 118
See application file for complete search history.

(56) References Cited

U.S. PATENT DOCUMENTS

| | | | | |
|---|---|---|---|---|
| 5,487,116 A | * | 1/1996 | Nakano et al. | 382/104 |
| 5,694,483 A | * | 12/1997 | Onoguchi | 382/154 |
| 6,526,157 B2 | * | 2/2003 | Hayashi | 382/106 |
| 6,731,777 B1 | * | 5/2004 | Nishigaki et al. | 382/106 |
| 6,813,370 B1 | * | 11/2004 | Arai | 382/104 |
| 6,868,168 B2 | * | 3/2005 | Tsuji | 382/104 |
| 6,906,620 B2 | * | 6/2005 | Nakai et al. | 340/435 |
| 6,963,657 B1 | * | 11/2005 | Nishigaki et al. | 382/106 |
| 6,985,175 B2 | * | 1/2006 | Iwai et al. | 348/187 |
| 7,023,473 B2 | * | 4/2006 | Iwai et al. | 348/187 |
| 7,113,632 B2 | * | 9/2006 | Lee et al. | 382/154 |

FOREIGN PATENT DOCUMENTS

| | | |
|---|---|---|
| JP | 11-328365 | 11/1999 |
| JP | 2000-293693 | 10/2000 |
| JP | 2002-170111 | 6/2002 |

OTHER PUBLICATIONS

Kang et al, "Road lane segmentation using dynamic programming for active safety vehicles", Pattern Recognition Letters 24 (2003) 3177-3185.*

(Continued)

*Primary Examiner*—Samir Ahmed
*Assistant Examiner*—Andrae S Allison
(74) *Attorney, Agent, or Firm*—Oblon, Spivak, McClelland, Maier & Neustadt, P.C.

(57) ABSTRACT

The stereo calibration apparatus includes an image input device inputting an image from each of two image pickup devices, a straight-line detector detecting at least four straight lines from each of two input images, a straight-line correspondence detector detecting at least four sets of corresponding lines by using an image feature in a neighboring area of the straight line, and a transformation matrix calculator calculating a transformation matrix between two image pickup devices from the sets of corresponding lines.

15 Claims, 10 Drawing Sheets

OTHER PUBLICATIONS

Taylor et al, "A Real-Time Approach to Stereopsis and Lane-Finding", Intelligent Vehicles Symposium, 1996., Proceedings of the 1996 IEEE Publication Date: Sep. 19-20, 1996 On pp. 207-212□□.*

Kweon et al, "A Stereo Matching Algorithm Using Line Segment Features", TENCON '89. Forth IEEE Region 10 International Conference Publication Date: Nov. 22-24, 1989 On pp. 589-592□□.*

Gracias et al, "Robust estimation of the fundamental matrix and stereo correspondences", In 5th International Symposium on Intelligent Robotic Systems, Jul. 1997. □□.*

Martin A. Fischler, et al. "Random Sample Consensus: A Paradigm for Model Fitting with Applications to Image Analysis and Automated Cartography", Communications of the ACM, vol. 24, No. 6, 1981, pp. 381-395.

Hiroaki Sakoe, et al. "Dynamic Programming Algorithm Optimization for Spoken Word Recognition", IEEE Transactions on Acoustics, Speech, and Signal Processing, vol. 26, No. 1, 1978, pp. 43-49.

Naoki Chiba, et al. "A Tracker for Broken and Closely-Spaced Lines", Trans. of IEICE D-II, vol. J81-D-II, No. 8, 1998, pp. 1744-1751.

W.H. Press, et al., "Singular Value Decomposition" Numerical Recipes In c, (ISBN 0-521-43108-5). 1998, pp. 59-70.

M. Takagi, et al. "Handbook of Image Analysis", (ISBN 4-13-061107-0), 1991, pp. 548-583.

* cited by examiner

IMAGE OF CAMERA a

IMAGE OF CAMERA b

IMAGE OF CAMERA a    IMAGE OF CAMERA b

LEFT IMAGE          RIGHT IMAGE

STEREO CALIBRATION APPARATUS AND STEREO IMAGE MONITORING APPARATUS USING THE SAME

This application is based upon and claims the benefit of priority from the prior Japanese Patent Application No. 2003-68835 filed on Mar. 13, 2003 and Japanese Patent Application No. 2003-165757 filed on Jun. 10, 2003; the entire contents of which are incorporated herein by reference.

BACKGROUND OF THE INVENTION

1. Field of the Invention

The present invention relates to a stereo calibration apparatus for acquiring the image transformation parameters between a plurality of image pickup devices, and a stereo image monitoring apparatus using the same stereo calibration apparatus.

2. Description of the Related Art

In an image monitor for automatically detecting a suspicious person, employing an image pickup device such as a CCD camera, and an active safety device or a vehicle guidance system for finding an obstacle on the road or recognizing the traffic lane, employing an image pickup device mounted on the vehicle, a higher detection performance can be easily attained by monitoring a common field of view, employing a plurality of image pickup devices rather than one image pickup device.

The reason is that there are virtually an infinite number of variations for the target such as an invader or obstacle, and that it is actually impossible to obtain the specifications encompassing all the variations. Hence, in the environment where there is a false detection factor such as a texture similar to the target or an unexpected image change on the road surface, it is very difficult to correctly distinguish the target based on an image pattern alone. On the other hand, if a plurality of image pickup devices can be used, information regarding the three dimensional position or structure of the object in the common field of view is obtained on the basis of a stereoscopic principle. This makes it possible to easily distinguish the target from the false detection factor.

In order to obtain the three dimensional information of the object accurately, a stereoscopic matching problem must be solved for all positions in an image, but is very difficult to solve, especially when there are complex and many environmental disturbances such as in the outdoor environment. However, in cases of using a method as described in JP-A-Hei. 11-328365or JP-A-2000-293693, although precise three dimensional information on a structure of an object is not obtained, it becomes possible to correctly detect only an image area having a height with respect to a certain plane in the three dimensional space, which is used as a reference, such as the ground or road surface. Even in the outdoor environment, it becomes possible to detect presence/absence of a target and a position of the target precisely.

The principle of these methods is as follows.

Suppose now that two image pickup devices of cameras are installed to monitor a monitoring region as the common field of view. The monitoring region without invader or obstacle is assumed to be a plane within the three dimensional space such as the road surface, which is called a reference plane. If a point X on the reference plane is photographed by two cameras at the same time, where an image of X photographed by one camera has the image coordinates (x, y) and an image of X photographed by the other camera has the image coordinates (x', y'), and the cameras have the focal length f and f', respectively. A transformation from one camera image to the other is the projection transformation, represented by the following relation.

$$x' = f'\frac{H_{11}x + H_{12}y + H_{13}f}{H_{31}x + H_{32}y + H_{33}f} \quad y' = f'\frac{H_{21}x + H_{22}y + H_{23}f}{H_{31}x + H_{32}y + H_{33}f} \quad (1)$$

Herein, supposing that the coordinates of each image are represented as $X=(x, y, f)^T$ and $X'=(x', y', f')^T$, employing a homogeneous coordinate representation (T denotes a transposition), and H is a 3×3 matrix consisting of $H_{11}, \ldots, H_{33}$ elements, the image transformation X to X' is represented such as, $$sx'=Hx \quad (2)$$

where s is a non-zero constant. Since s depends on X and H has the degree of freedom 8, H is represented without losing generality as follows.

$$\mathbb{H} = \begin{pmatrix} H_{11} & H_{12} & H_{13} \\ H_{21} & H_{22} & H_{23} \\ H_{31} & H_{32} & 1 \end{pmatrix} \quad (3)$$

As far as X is on the reference plane, H can be obtained as constant irrespective of X. H is called a transformation matrix. When the transformation matrix H is known, the transformation X to X' is calculated in accordance with the expression (2). The image feature (brightness value) near the coordinates (x, y) of one camera image and the image feature near the coordinates (x', y') of the other camera image are compared. If both are identical, it is judged that X is on the reference plane. On the contrary, if both the image features are different, it is judged that X is not on the reference plane, that is, some invader or obstacle having a height with respect to the reference plane exists at the position (x, y) or (x', y') in the image.

In this manner, if H is calculated in advance, it is possible to determine whether or not any object having a height is on the reference plane, and a high performance image monitor without falsely detecting any texture or object image on the road surface is realized.

A conventional method for calculating H will be described below.

If four or more sets of corresponding points (pixels) between two camera images $\{X_m=(x_m, y_m, f)^T, X'_m=(x'_m, y'_m, f')^T\}$ (m=1, ..., M) are known, H can be calculated. More specifically, for $h=(H_{11}, H_{12}, H_{13}, H_{21}, H_{22}, H_{23}, H_{31}, H_{32})^T$, the expression (2) is rewritten into a linear expression of h, $$\begin{pmatrix} xf' & yf' & ff' & 0 & 0 & 0 & -xx' & -yx' \\ 0 & 0 & 0 & xf' & yf' & ff' & -xy' & -yy' \end{pmatrix} h = \begin{pmatrix} x'f \\ y'f \end{pmatrix} \quad (4)$$

Substituting each set of corresponding points $\{X_m, X'_m\}$ into this expression, and solving the obtained simultaneous equations, h, that is, H can be calculated. From this, a method for calculating H not only uses the set of corresponding points but also detects the straight lines in the image and uses the line correspondences between the camera images is led as follows.

Now, suppose that together with the set of corresponding points $\{X_m, X'_m\}$, a set of corresponding straight lines between camera images $\{a_n x + b_n y + c_n f = 0,\ a'_n x' + b'_n y' + c'_n f = 0\}$ $(n=1, \ldots, N)$ are obtained. Representing the straight line with the parameters $I_n = (a_n, b_n, c_n)^T$, $I'_n = (a'_n, b'_n, c'_n)^T$, each straight line on the image is represented such that, $$l_n^T x = 0 \quad l_n'^T x' = 0 \quad (5)$$

Since the expressions (5) and (2) hold at the same time, a projective transformation expression regarding the straight line $$u I_n = H^T I'_n \quad (6)$$

is obtained (u is a non-zero constant). This expression (6) is expanded in the same manner as the expression (4). The simultaneous expressions of h obtained from the set of corresponding points $\{X_m, X'_m\}$ and the set of corresponding straight lines $\{I_n, I'_n\}$ are unified and finally represented such that, $$\begin{pmatrix} x_1 f' & y_1 f' & f f' & 0 & 0 & 0 & -x_1 x'_1 & -y_1 x'_1 \\ 0 & 0 & 0 & x_1 f' & y_1 f' & f f' & -x_1 y'_1 & -y_1 y'_1 \\ & & & & \vdots & & & \\ x_M f' & y_M f' & f f' & 0 & 0 & 0 & -x_M x'_M & -y_M x'_M \\ 0 & 0 & 0 & x_M f' & y_M f' & f f' & -x_M y'_M & -y_M y'_M \\ a'_1 c_1 & 0 & -a'_1 a_1 & b'_1 c_1 & 0 & -b'_1 a_1 & c'_1 c_1 & 0 \\ 0 & a'_1 c_1 & -a'_1 b_1 & 0 & b'_1 c_1 & -b'_1 b_1 & 0 & c'_1 c_1 \\ & & & & \vdots & & & \\ a'_N c_N & 0 & -a'_N a_N & b'_N c_N & 0 & -b'_N a_N & c'_N c_N & 0 \\ 0 & a'_N c_N & -a'_N b_N & 0 & b'_N c_N & -b'_N b_N & 0 & c'_N c_N \end{pmatrix} \quad (7)$$

$$h = \begin{pmatrix} x'_1 f \\ y'_1 f \\ \vdots \\ x'_M f \\ y'_M f \\ a_1 c'_1 \\ b_1 c'_1 \\ \vdots \\ a_N c'_N \\ b_N c'_N \end{pmatrix}$$

Solving this expression (7), h, that is, H is calculated. If M+N is greater than or equal to four, H is calculated, employing various solving methods as described in "W. H. Press et al, Numerical Recipes in C, ISBN 0-521-43108-5".

In order to obtain the projective matrix in the above manner, it is presumed that the set of corresponding points (pixels) and the set of straight lines between the camera images are obtained in advance.

However, many conventional image monitoring apparatuses required that a operator manually calculated the set of corresponding points and the set of corresponding straight lines when installing the image monitors, whereby the operator had to make the operation carefully without mistaking the correspondence, and calculate a great number of corresponding points and corresponding straight lines to acquire the transformation matrix at high precision, which took a lot of time.

When the image monitoring apparatus is mounted with some "deviation" in a place where vibration often occurs or uses a camera mounted on a vehicle, a situation may arise that is less favorable for a user who uses the image monitoring apparatus before recalibration is made by the coordinator, for example, the image monitoring apparatus may cause a malfunction, or the operator is needed to dispatch to the installed place.

As described above, to realize a high performance image monitoring apparatus or an obstacle detecting apparatus as described in JP-A-Hei.11-328365 and JP-A-2000-293693, it is required to make beforehand a stereo calibration for acquiring the image transformation parameters between the image pickup devices.

In the conventional stereo calibration apparatus, a manual operation of designating the corresponding points by the operator is essential, and enormous manpower cost and a lot of operation time are needed. Particularly, when a number of stereo calibrations are needed to be made, or the mounting of camera is unexpectedly changed, there is a problem that the manpower cost and the operation time are further increased.

BRIEF SUMMARY OF THE INVENTION

The present invention has been achieved in the light of the above-mentioned problems. It is an object of the invention to provide a stereo calibration apparatus and a stereo image monitoring apparatus using the stereo calibration apparatus, in which a stereo calibration is automated by automatically acquiring the set of corresponding straight lines between images to calculate a transformation matrix even if there is a difference between the picked up images due to difference between the mounting positions of a plurality of image pickup devices, and image transformation parameters with high precision are acquired in a short time without intervention of the operator.

According to the embodiment of the invention, a stereo calibration apparatus obtains a transformation matrix, which is an image transformation parameter between a pair of image pickup devices for photographing a preset common area. The stereo calibration apparatus includes an image input device to which a pair of images is input from the one pair of image pickup devices, a straight-line detector detecting at least four straight lines from each of images output from the image input device, a straight-line correspondence detector detecting at least four sets of corresponding lines between the images by using an image feature in neighboring areas of the straight lines, and a transformation matrix calculator calculating the transformation matrix by using the sets of corresponding lines.

According to the embodiment of the invention, a stereo calibration method obtains a transformation matrix, which is an image transformation parameter between a pair of image pickup devices for photographing a preset common area. The method includes inputting a pair of images from the image pickup devices, detecting at least four straight lines from each of input images, detecting at least four sets of corresponding lines between the images by using an image feature in neighboring areas of the straight lines, and calculating the transformation matrix between the image pickup devices by using the sets of corresponding lines.

According to the embodiment of the invention, a program which is executed by a computer to perform a process for obtaining a transformation matrix, which is an image transformation parameter between a pair of image pickup devices for photographing a preset common area. The process includes inputting a pair of images from the image pickup devices, detecting at least four straight lines from each of input images, detecting at least four sets of corresponding lines between the images by using an image feature in neighboring areas of the straight lines, and calculating the transformation matrix between the image pickup devices by using the sets of corresponding lines.

According to the embodiment of the invention, a stereo image monitor for detecting an object includes a pair of image pickup devices configured to photograph images containing a common area, a straight-line detector detecting at least four straight lines from each of the images, a straight-line correspondence detector detecting at least four sets of corresponding lines between the images by using an image feature in neighboring areas of the straight lines, a transformation matrix calculator calculating the transformation matrix by using the sets of corresponding lines, and a monitor transforming one of the pair of images by using the transformation matrix to detect an object in the common area.

According to the embodiment of the invention, a stereo image monitoring method monitors a common area, which photographed by a pair of image pickup devices. The stereo image monitoring method includes inputting a pair of images from the image pickup devices, detecting at least four straight lines from each of input images, detecting at least four sets of corresponding lines between the images using an image feature in neighboring areas of the straight lines, calculating a transformation matrix between the image pickup devices by using the sets of corresponding lines, and transforming one of the pair of images by using the transformation matrix to detect an object in the common area.

According to the embodiment of the invention, a program which is executed by a computer to perform a process for monitoring a common area, which photographed by a pair of image pickup devices. The process includes inputting a pair of images from the image pickup devices, detecting at least four straight lines from each of input images, detecting at least four sets of corresponding lines between the images by using an image feature in neighboring areas of the straight lines, calculating a transformation matrix between the image pickup devices by using the sets of corresponding lines, and transforming one of the pair of images by using the transformation matrix to detect an object in the common area.

According to the embodiment of the invention, a stereo calibration apparatus obtains a transformation matrix, which is an image transformation parameter between a pair of image pickup devices for photographing a preset common area. The stereo calibration apparatus includes an image input device to which a pair of images is input from the one pair of image pickup devices, a straight-line detector detecting at least four straight lines from each of images output from the image input device, a straight-line correspondence detector detecting at least four sets of corresponding lines between the images by using a geometrical relation among the straight lines, and a transformation matrix calculator calculating the transformation matrix by using the sets of corresponding lines.

According to the embodiment of the invention, a stereo calibration method obtains a transformation matrix, which is an image transformation parameter between a pair of image pickup devices for photographing a preset common area. The method includes inputting a pair of images from the image pickup devices, detecting at least four straight lines from each of input images, detecting at least four sets of corresponding lines between the images by using a geometrical relation among the straight lines, and calculating the transformation matrix between the image pickup devices by using the sets of corresponding lines.

According to the embodiment of the invention, a program causes a computer to perform a process for obtaining a transformation matrix, which is an image transformation parameter between a pair of image pickup devices for photographing a preset common area. The process includes inputting a pair of images from the image pickup devices, detecting at least four straight lines from each of input images, detecting at least four sets of corresponding lines between the images by using a geometrical relation among the straight lines, and calculating the transformation matrix between the image pickup devices by using the sets of corresponding lines.

According to the embodiment of the invention, a stereo image monitor for detecting an object includes a pair of image pickup devices configured to photograph images containing a common area, an image input device to which a pair of images is input from the image pickup devices, a straight-line detector detecting at least four straight lines from each of images output from the image input device, a straight-line correspondence detector detecting at least four sets of corresponding lines between the images by using a geometrical relation among the straight lines, a transformation matrix calculator calculating the transformation matrix by using the sets of corresponding lines, and a monitor transforming one of the pair of images by using the transformation matrix to detect an object in the common area.

According to the embodiment of the invention, a stereo image monitoring method monitors a common area, which photographed by a pair of image pickup devices. The method includes inputting a pair of images from the image pickup devices, detecting at least four straight lines from each of input images, detecting at least four sets of corresponding lines between the images by using a geometrical relation among the straight lines, calculating a transformation matrix between the image pickup devices by using the sets of corresponding lines, and transforming one of the pair of images by using the transformation matrix to detect an object in the common area.

According to the embodiment of the invention, a program which is executed by a computer to perform a process for monitoring a common area, which photographed by a pair of image pickup devices. The process includes inputting a pair of images from the image pickup devices, detecting at least four straight lines from each of input images, detecting at least four sets of corresponding lines between the images by using a geometrical relation among the straight lines, calculating a transformation matrix between the image pickup devices by using the sets of corresponding lines, and transforming one of the pair of images by using the transformation matrix to detect an object in the common area.

DETAILED DESCRIPTION OF THE PREFERRED EMBODIMENTS

First Embodiment

Referring to FIGS. 1 to 9, a first embodiment of the present invention will be described below.

Figure 1:
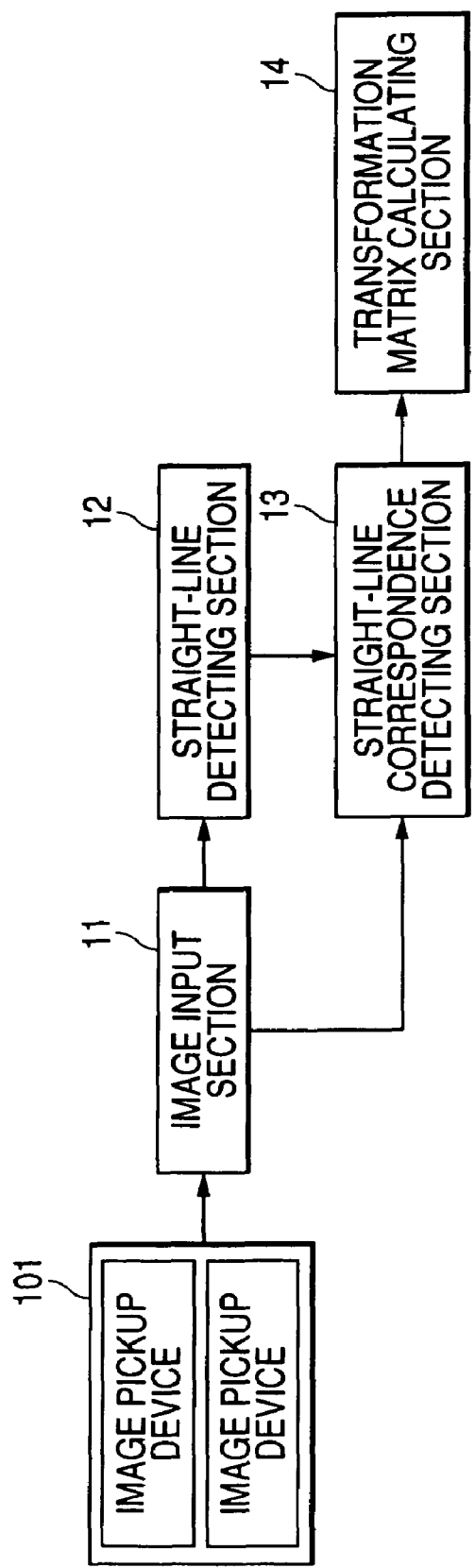
FIG. 1 is a schematic block diagram of an obstacle detecting apparatus according to an embodiment of the present invention.

FIG. 1 is a schematic block diagram of a stereo calibration apparatus according to an embodiment of the invention.

The stereo calibration apparatus of this embodiment includes an image input section 11, a straight-line detecting section 12, a straight-line correspondence detecting section 13, and a transformation matrix calculating section 14. A program stored in a computer implements functions of the sections 11 to 14.

(1) Image Input Section 11

The image input section 11 is supplied with an image from image pickup devices 101.

Figure 2:
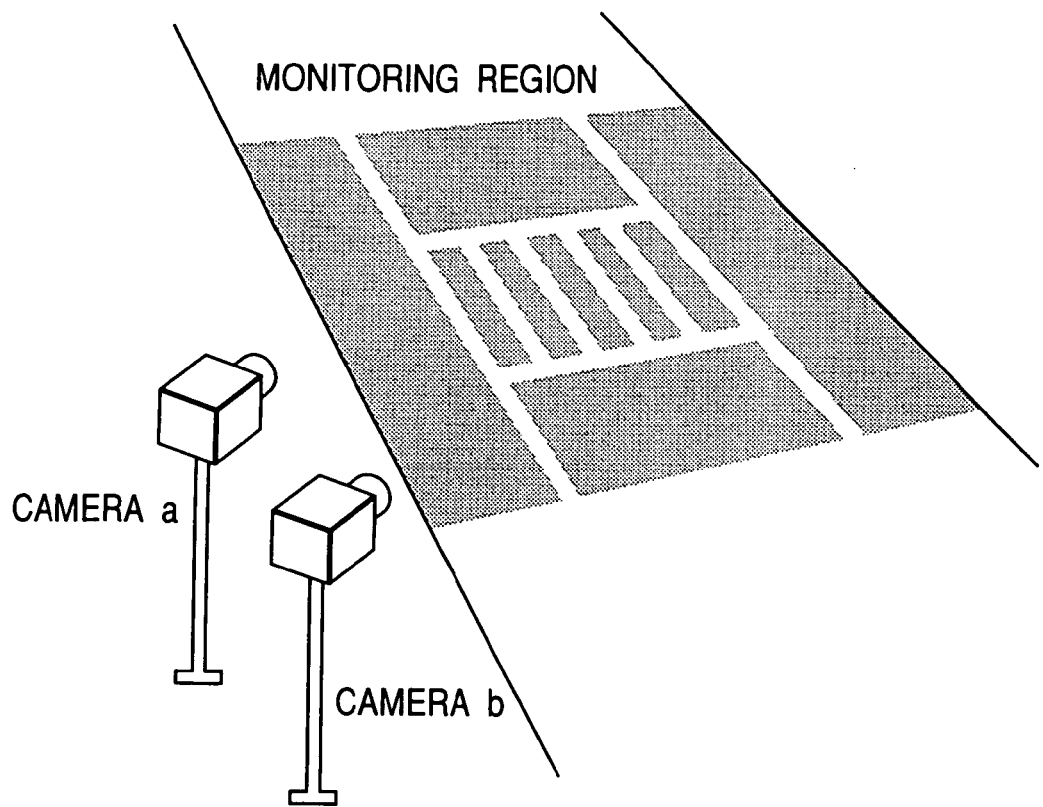
FIG. 2 is a typical view showing a monitoring region and an installed state of the image pickup devices.
Figure 3:
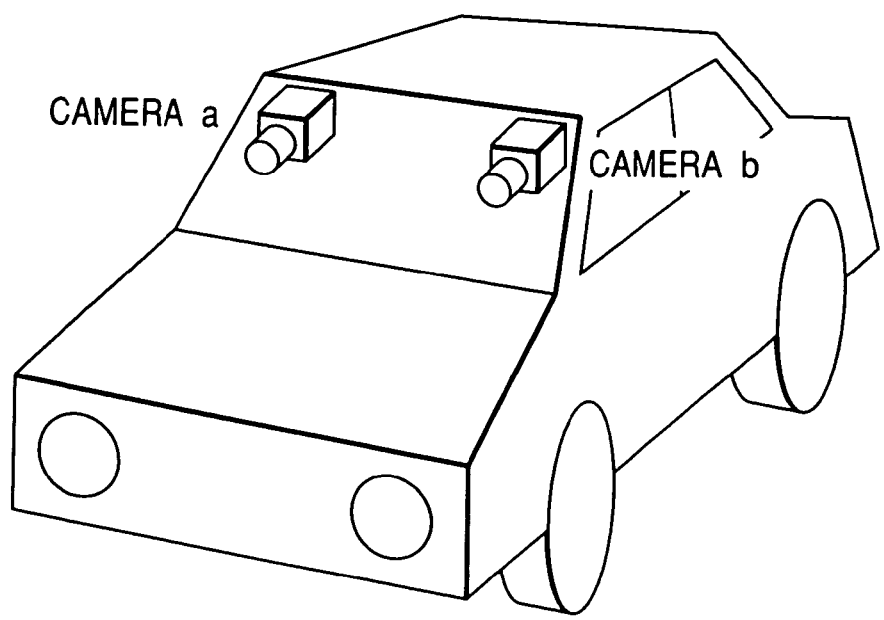
FIG. 3 is a typical view showing an installed state of the image pickup devices mounted on a vehicle.

In this embodiment, image pickup devices 101 are two image pickup devices such as a CCD camera. For example, two image pickup devices may be installed at two upper locations in a monitoring region as shown in FIG. 2. Alternatively, in case that the two image pickup devices are mounted on a vehicle, the two image pickup devices may be mounted on left and right sides in the front part of the vehicle as shown in FIG. 3.

Herein, during the stereo calibration apparatus is operating, a plane (e.g., road surface) in the three dimensional space such as the monitoring region of FIG. 2 is photographed by both cameras and it is assumed that there is no object having a height on the plane.

Hence, it is supposed that all the straight lines detected by the straight-line detecting section 12 at a later stage are acquired from texture on the plane.

The image input section 11 serially A/D-converts a video signal output from the image pickup device 101, and accumulates a digital image or a series of images in a memory within the image input section 11. Then, an image requested for any area at any time is output to the straight-line detecting section 12 and the straight-line correspondence detecting section 13.

(2) Straight-line detecting section 12

The straight-line detecting section 12 detects the straight line in a plurality of images, which are output from the image pickup device 101 and accumulated in the image input section 11.

Herein, a method for detecting what contains pixels having large brightness gradient and arranged linearly as a straight line will be described below.

The "brightness gradient" means a degree of brightness change near the pixel. In the monitoring region of FIG. 2, the brightness gradient has a larger value in a boundary area of a structure within the image such as a boundary of a white line on the road surface (simply called an edge).

One of the methods for calculating the brightness gradient involves applying a filter such as a Sobel operator on the image.

A method for acquiring the edge pixel with the Sobel operator will be described below.

Figure 4:
FIG. 4 is a typical diagram showing a method for acquiring the brightness gradient in the straight-line detecting section.

Assuming that the brightness at a position (x,y) in the image is I(x,y), and filter elements $F_x(i,j)$ and $F_y(i,j)$ are set up as shown in FIG. 4, values $G_x$ and $G_y$ of the image on which this filter is applied, $$G_x(x, y) = \sum_{i,j=-1,0,1} F_x(i, j)I(x+i, y+j) \quad (8)$$

$$G_y(x, y) = \sum_{i,j=-1,0,1} F_y(i, j)I(x+i, y+j)$$

represent the degree of brightness change in the horizontal and vertical directions near the position (x,y), respectively. Therefore, the brightness gradient intensity G(x,y) is given such as, $$G(x, y) = \sqrt{G_x(x, y)^2 + G_y(x, y)^2} \quad (9)$$

Figure 5:
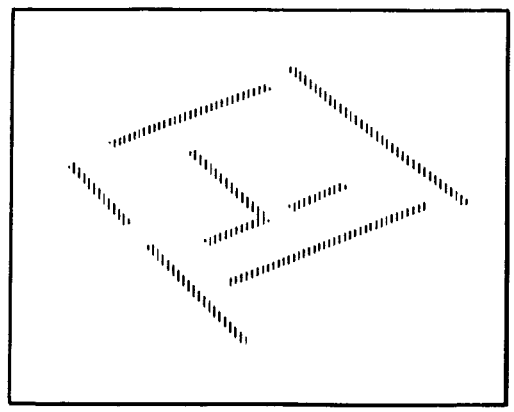
FIG. 5 is a typical view showing the edge pixels acquired in the straight-line detecting section.
Figure 5:
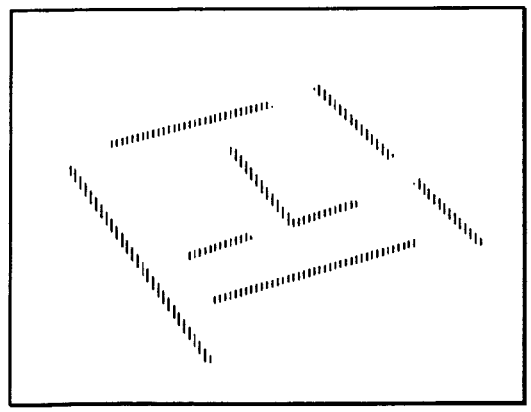

Hence, the edge pixel is acquired by extracting only pixels in which the brightness gradient intensity is greater than a preset threshold value. FIG. 5 shows examples of edge pixels acquired from each camera image when the cameras a and b are installed as shown in FIG. 2.

Besides, there are other filters for acquiring the brightness gradient such as Laplacian, Robinson, and Canny, any of which may be employed. The known brightness gradient calculating method was described in detail in "Image Analysis Handbook, supervised by Takagi and Shimoda, Tokyo University Press, ISBN4-13-061107-0".

After the edge image is obtained, the straight line passing through the edge pixels is detected, employing a method called a Hough transformation. The Hough transformation is known as a method for detecting the straight line in the image (see the above "Image Analysis Handbook"). In short, when the edge pixel position (x,y) is transformed into a trigonometric function curve in the (ρ,θ) space, employing $$\rho = x \cos\theta + y \sin\theta \tag{10}$$

the points of intersection between a plurality of curves generated by the edge pixels correspond to the straight line, whereby the line parameters (a,b,c) are calculated from the (ρ,θ) value at the point of intersection and the expression (10) when the straight line is expressed in ax+by+c=0.

Figure 6:
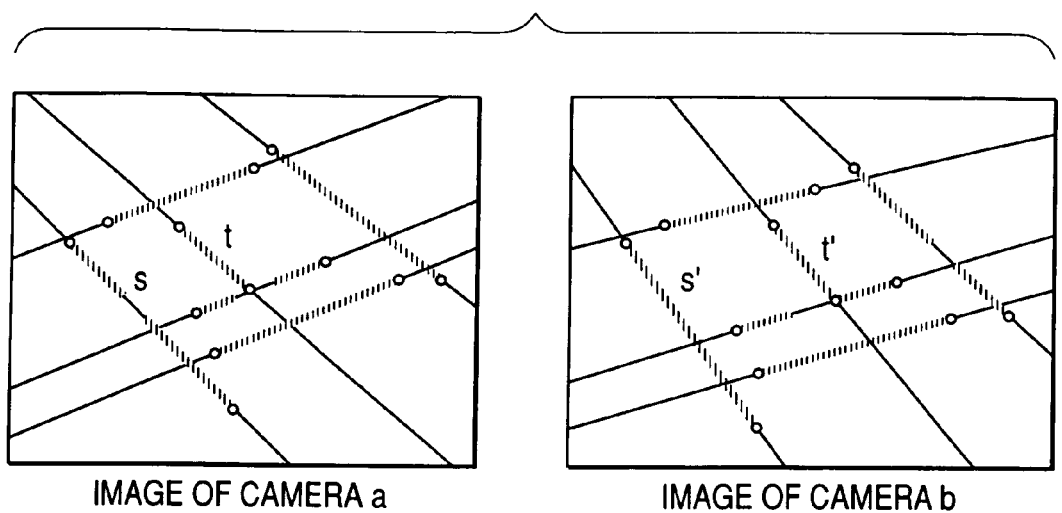
FIG. 6 is a typical view showing the straight lines acquired in the straight-line detecting section.

Also, a line fitting with a robust estimation of RANSAC as described in a "Random Sample Consensus: A Paradigm for Model Fitting with Applications to Image Analysis and Automated Cartography, M. A. Fischler et al, Communications of the ACM, Vol. 24, No. 6, pp. 253-267, 1981" is effective for detecting the straight line in the edge image. Briefly, the line fitting is made for a group of edge pixels by least square, when a plurality of edge pixels selected randomly are given as initial values. The pixels having large deviation value (distance) off the straight line are removed and the edge pixels having small deviation value are newly included. Then, the line fitting is made again in a similar manner. If the above line fitting is repeated until the maximum deviation value falls within a permissible range, the straight line passing through the edge pixels arranged thereon is detected. Even if the group of edge pixels may be discontinuous or may be continuously bent like an L-character as shown in FIG. 5, the straight line is correctly obtained as shown in FIG. 6 by using these methods.

The above straight line detecting process is performed for each image from two image pickup devices to obtain four or more straight lines for each image. Assuming that the parameter of the straight line is $I = (a, b, c)^T$ and that the image coordinate is the homogeneous coordinate representation $X = (x, y, f)^T$ (f is the focal length), the straight line is represented as $I^T X = 0$. If there are only the line parameters, it is unknown in which part of the image the edge pixels making up the straight line are present. Therefore, two end points in the group of edge pixels existing on the straight line or within the permissible range near the straight line are obtained for each straight line as indicated by round signs in FIG. 6.

(3) Straight-Line Correspondence Detecting Section 13

The straight-line correspondence detecting section 13 acquires a neighboring image area of the straight line, which the straight-line detecting section 12 detects from the image input section 11, and acquires a set of corresponding lines between two images by comparison of the image feature. The "image feature" means the physical quantity such as brightness, color or movement extracted from the image by which a distinction is permitted between the detected neighboring area of the straight line and the other area.

Figure 7:
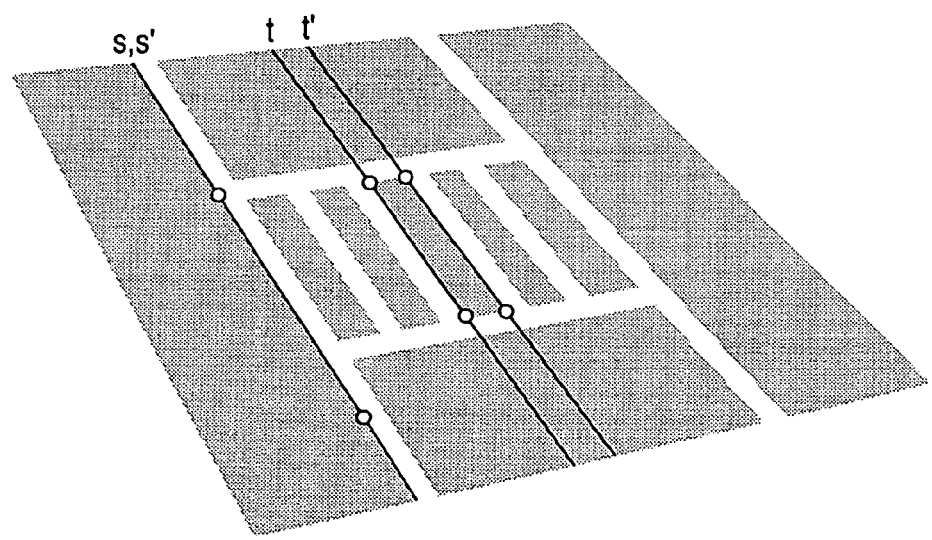
FIG. 7 is a typical view showing a correspondence relation between the straight lines in the monitoring region.

Herein, the "set of corresponding lines" means the set of straight lines in the images photographed by two cameras that are based on the same monitoring area. For example, the straight lines s and s' are shown in the images of the cameras and b in FIG. 6. As shown in FIG. 7, when two straight lines are the images of the same straight line in the monitoring region, the straight lines s and s' are the set of corresponding lines. On the other hand, the straight lines t and t' of FIG. 6 are the images of different straight lines of FIG. 7 and not the set of corresponding lines.

(3-1) Method Using Area Matching

As a method for detecting the set of corresponding lines, area matching may be applied using the image feature near the straight line. The "area matching" means calculating a degree of coincidence between an image area, which is a comparison-source, and an image area, which a comparison-target.

The present inventors have originally created a method based on the simplest SAD (Sum of Absolute Difference), which will be described below.

Supposing that two image areas to be compared are represented as R because of being isomorphic, that a position in R is (x,y), and that the pixel brightness of the comparison source at the position is I(x,y) and that the pixel brightness of the comparison target at the position is I'(x,y), $$E_R = \sum_{(x,y) \in R} |I(x,y) - I'(x,y)| \tag{11}$$

is calculated. As this value is smaller, two image areas are more coincident.

When it is difficult to make the matching between the straight lines directly, the area matching may be performed for any area centered at arbitrary point on the straight line to compare the sums.

Figure 8:
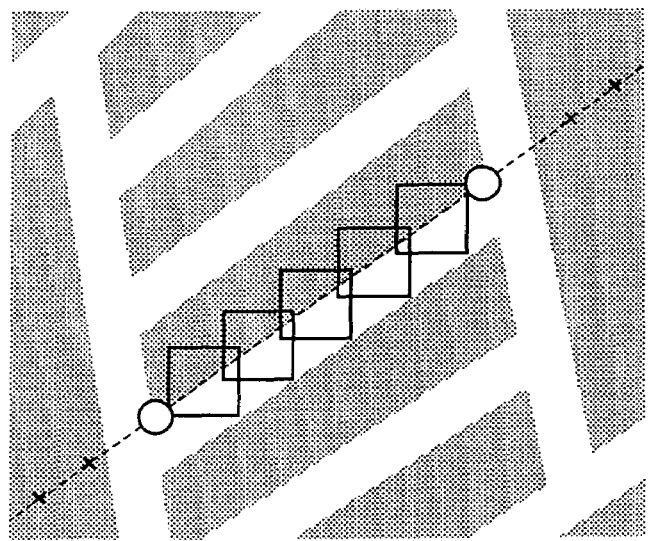
FIG. 8 is a typical view showing a method for acquiring the straight line correspondence by the image correlation in the straight-line correspondence detecting section.

FIG. 8 shows an example in which five rectangular areas are arranged at an equal spacing between two end points of the straight line.

Those rectangular areas are set for two different straight lines, and the matching calculation is conducted in due order to obtain $E_R$. And if the sum $\Sigma E_R$ is smaller, it is considered that the degree of coincidence between the straight lines is higher. Setting the straight line s in the image of camera a as the comparison source and the entire line in the image of camera b as the comparison target in FIG. 6, the above processing is performed. Then, the image pattern near the straight line has the highest similarity, whereby a line having the minimum sum $\Sigma E_R$, namely, that the line s' being the most coincident to the straight line s is detected.

On the contrary, since the straight lines t and t' that are not based on the same monitoring area have different image patterns near the straight lines, the straight lines having a low degree of coincidence, that is, having the large sum $\Sigma E_R$ are only found. Hence, the straight lines t and t' are excluded from the output of the straight-line correspondence detecting section 13, because the corresponding lines are not found for t, t' by comparison with a present threshold value. This procedure is performed for all the straight lines in the image of camera a to acquire the corresponding lines in the image of camera b.

At least four sets of corresponding lines are acquired to obtain the transformation matrix H.

(3-2) Dynamic Programming

When two straight lines to be compared have different lengths (distances between the end points), or a part of one straight line is not included in the other straight line, it is often difficult to detect the corresponding lines by area matching. In such a case, the dynamic programming is effectively employed.

In "Dynamic Programming Algorithm Optimization for Spoken Word Recognition, H. Sakoe et al, IEEE Trans. on ASSP, Vol.26, No.1, pp. 43-49, 1978", an instance of applying the dynamic programming to the voice recognition was described. However, since this description involved a technique regarding the voice recognition, the present inventors have applied this dynamic programming to the image processing and originally created a technique for determining the degree of coincidence between the image features near the straight lines. In the following, the dynamic programming for the image processing will be described.

Figure 9:
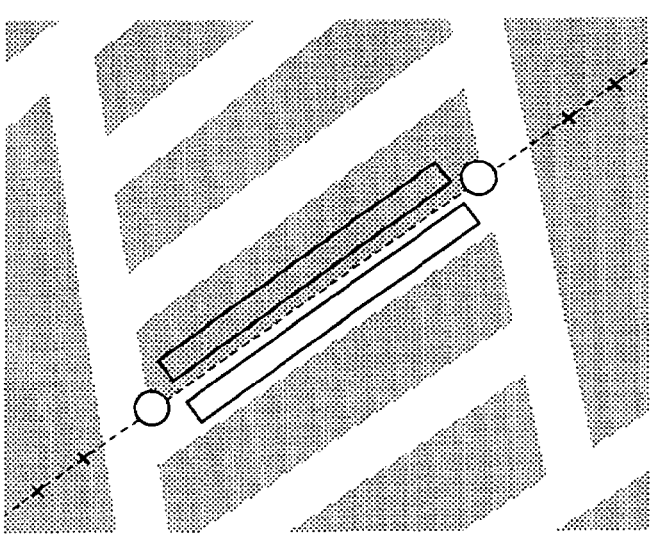
FIG. 9 is a typical view showing a method for acquiring the straight line correspondence by a dynamic programming in the straight-line correspondence detecting section.
Figure 9:
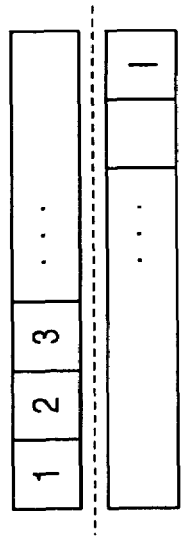

Now, it is supposed that a neighboring area is set up for the straight line, which is a comparison source, as shown in FIG. 9, that each of two areas on both sides of the straight line is equally partitioned at a regular preset width in the long side direction, and that a total of I minute sub areas are obtained from two areas, as shown to the right in FIG. 9.

The average value of pixel brightness is calculated for each of the minute sub areas, and the average values are arranged in arranged order of minute sub areas, whereby the data series $A=\{a_i\}$ for I elements is obtained, indicating the image feature in the straight line neighboring area.

Likewise, the rectangular areas are set for the straight line, which is a comparison target, whereby the image feature data series $B=\{b_j\}$ for J elements is obtained through the same operation.

When the lengths I of A and J of B are different, the data series A and B can not be compared by the matching operation. In the dynamic programming, i and j are represented as a function of another parameter k to avoid this drawback.

The correspondence state between the data series A and B is represented such as, $$F=\{c(1), c(2), \ldots, c(k), \ldots, c(k)\}(c(k)=(i(k), j(k))) \quad (12)$$

(F is called a warp function). Herein, a data difference $d(c)=|a_i-b_j|$ is defined, and assuming that a weight function for the data difference is w(k), the weighted sum of d(c) normalized by the weight sum $$D_F(A, B) = \frac{\sum_k d(c(k))w(k)}{\sum_k w(k)} \quad (13)$$

is considered as a normalized distance between the data series A and B in the warp function F. If $D_F(A,B)$ is repeatedly computed by changing w(k) in accordance with the correspondence state c(k) of data so that $D_F(A,B)$ may be smaller, the minimum value of $D_F(A,B)$ for F is searched. Consequently, the acquired minimum value $$D(A, B) = \min_F D_F(A, B) \quad (14)$$

is regarded as indicating the distance between the data A and B. Since two straight lines are considered to be coincident when a small value of D is obtained between two straight lines, the corresponding lines between the images are detected in the same manner as the area matching process.

The method for setting the weight function w(k) depending on the correspondence state c(k) of data was described in detail in the above "Dynamic Programming Algorithm Optimization for Spoken Word Recognition".

By the above method, the normalized distance is acquired by making all the straight lines detected in one image correspond to the straight lines detected in another image, whereby the straight line having the minimum normalized distance is stored as the corresponding line.

To obtain the transformation matrix H, at least four sets of corresponding lines are acquired.

(3-3) Other Methods

In addition, there are a variety of methods for acquiring the degree of coincidence between image areas, including SSD (Sum of Squared Difference), normalized correlation coefficient, and structure matching, any of which may be employed. Some of the well known methods were detailed in the above "Image Analysis Handbook".

Also, the matching areas may be arbitrarily set up, such as long rectangles extending to the left and right of the straight line, as shown in FIG. 9.

(4) Transformation Matrix Calculating Section 14

The transformation matrix calculating section 14 calculates a transformation matrix H having the image transformation parameters between the image pickup devices from at least four sets of corresponding lines detected in the straight-line correspondence detecting section 13.

Suppose that the sets of corresponding lines $\{l_n=(a_n, b_n, c_n)^T\}$, $\{l'_n=(a'_n, b'_n, c'_n)^T\}$ (n=1, ..., N) are obtained from the straight-line correspondence detecting section 13. Assuming that the transformation matrix H is represented in the same manner as the expression (3), and $h=(H_{11}, H_{12}, H_{13}, H_{21}, H_{22}, H_{23}, H_{31}, H_{32})^T$, if only the part of the line parameters is extracted from the expression (7), $$\begin{pmatrix} a'_1 c_1 & 0 & -a'_1 a_1 & b'_1 c_1 & 0 & -b'_1 a_1 & c'_1 c_1 & 0 \\ 0 & a'_1 c_1 & a'_1 b_1 & 0 & b'_1 c_1 & -b'_1 b_1 & 0 & c'_1 c_1 \\ & & & \vdots & & & & \\ a'_N c_N & 0 & -a'_N a_N & b'_N c_N & 0 & -b'_N a_N & c'_N c_N & 0 \\ 0 & a'_N c_N & -a'_N b_N & 0 & b'_N c_N & -b'_N b_N & 0 & c'_N c_N \end{pmatrix} h = \quad (15)$$

$$\begin{pmatrix} a_1 c'_1 \\ b_1 c'_1 \\ \vdots \\ a_N c'_N \\ b_N c'_N \end{pmatrix}$$

results. Solving this expression (15) by substituting all $\{l_n, l'_n\}$, h, that is, H is obtained. Since the expression (15) is a general simultaneous linear equation, there are several well known solving methods as described in the above "Numerical Recipes in C", a typical method of which will be briefly described below. Supposing that A is the 8×2N matrix on the left side of the expression (15) to operate on h and b is the 1×2N vector on the right side, $$Ah=b \quad (16)$$

is obtained. When A is the square matrix (N=4), an inverse matrix $A^{-1}$ exists if A is non-singular. In accordance with $$h=A^{-1}b \quad (17)$$

h is obtained.

When A is not the square matrix (N>4), h is directly obtained from the following expression (18), if $A^T A$ is non-singular, $$h=(A^T A)^{-1} A^T b \quad (18)$$

When it is desired to calculate h with less error, the singular value decomposition of A, $A=UWV^T$, is employed, where U is the 8×2N columnar orthogonal matrix, W is the 8×8 non-negative diagonal matrix (W=[diag($w_k$)], k=1, . . . , 8), and V is the 8×8 orthogonal matrix, and h is obtained as the least square solution such as, $$h = V[\text{diag}(1/w_k)]U^T b \quad (19)$$

Other solving methods were detailed in the above "Numerical Recipes in C". The expression (15) may be solved, employing any solving method, whereby h is obtained. When h has no solution or is not uniquely decided, such as when N<4 or the matrix is singular, the transformation matrix calculating section 14 outputs an indication that H is not calculated.

(5) Effects and Application Examples of Embodiments

In this manner, the stereo calibration is automated by automatically acquiring the set of corresponding lines between images and calculating the transformation matrix, greatly reducing the manpower cost and the operation time that were enormously needed with the conventional stereo calibration.

The transformation between one pair of images acquired by one pair of image pickup devices is enabled, employing the transformation matrix obtained by this stereo calibration apparatus. Accordingly, this stereo calibration apparatus is applied to the stereo image monitor for transforming one of images by using the transformation matrix to detect an obstacle.

MODIFICATION EXAMPLES

This invention is not limited to the above embodiments, but various variations or modifications may be made without departing the scope or spirit of the invention.

(1) Modification Example 1

For example, though two image pickup devices are employed in this embodiment, this embodiment may be applied to three or more image pickup devices, in which the stereo calibration is performed for all or any two of those image pickup devices. Consequently, the image transformation parameters can be acquired for any number of image pickup devices.

(2) Modification Example 2

If not only the set of corresponding lines acquired by the straight-line correspondence detecting section 13 but also the set of corresponding points are acquired at the same time, the transformation matrix calculating section 14 can calculate the transformation matrix, employing the set of corresponding lines and the set of corresponding points at the same time, in accordance with the expression (7), instead of the expression (15).

(3) Modification Example 3

Though the reference plane such as the road surface is assumed to be flat, when the reference plane is curved, it may be partially divided and approximated with flat surfaces. Thereby, this embodiment is applicable.

(4) Modification Example 4

Though in this embodiment, the area matching and the dynamic programming when the image feature is the pixel brightness or the average brightness of minute area have been exemplified. However, the image feature may be any quantity obtained from the image as below.

For example, when a color camera is used, it is possible to employ chroma and hue in the Munsell color system, the element values on the RGB plane, or the element values which are converted into any color system such as XYZ, UCS, CMY, YIQ, Ostwald, L*u*v*, or L*a*b*, as generally well known.

Also, the image feature may be resulted from a differential or integral operation on the image in space or over time.

More specifically, the image feature may be resulted by making a spatial differential operator such as Roberts, Robinson, Prewitt, Kirsch or Canny, Laplacian, Gaussian, or a moment operator, as well as Sobel, on the image, or making a noise removal process through an integral mean filter or a median filter.

Also, the image feature may be a statistical quantity obtained in the preset minute area for each pixel.

For example, in addition to the average brightness, the median, mode, range, variance, standard deviation, and mean deviation may be adopted.

Further, the image feature maybe a scalar or vector amount such as fillet diameter, area or movement amount that can be calculated from the image in the area resulted from making the object detection or segmentation in the image.

The above image features were detailed in the above "Image Analysis Handbook".

(5) Modification Example 5

Though the straight-line detecting section 12 acquires the edge pixels using the brightness gradient, the gradient (i.e., spatial change rate) of any image feature adopted in the modification example 4 may be acquired, in addition to/in spite of the brightness.

Therefore, in the straight-line detecting section 12, the edge pixel is acquired as the pixel having a large rate of change for any image feature, or at the area boundary resulted from the segmentation process.

(6) Modification Example 6

As an object of the invention, the image transformation parameter is calculated for the image monitor, the obstacle detection for the vehicle, or an automotive safety device, but this invention is not limited to such purposes. However, this invention may be also applicable to a driving support system with image processing that is mounted on the airplane, helicopter, and industrial or home use robot, a media processing technique for producing one panorama image by splicing a number of images and other various purposes.

Second Embodiment

Referring to FIGS. 10 to 13, a second embodiment of the invention will be described below.

A stereo calibration apparatus of the second embodiment includes the image input section 11, the straight-line detecting section 12, the straight-line correspondence detecting section 13, and the transformation matrix calculating section 14. The function of the sections 11 to 14 are implemented by a program stored in a computer.

Among them, the image input section 11, the straight-line detecting section 12 and the transformation matrix calculating section 14 have the same constitution of the first embodiment. Therefore, the straight-line correspondence detecting section 13 having a different constitution will be described below.

The straight-line correspondence detecting section 13 detects a set of corresponding lines between the images photographed by two image pickup devices among all the straight lines detected in the straight-line detecting section 12. When the image feature near the straight line is only employed, the same method of the first embodiment is usable, and will be roughly described below, though not detailed here.

Figure 10:
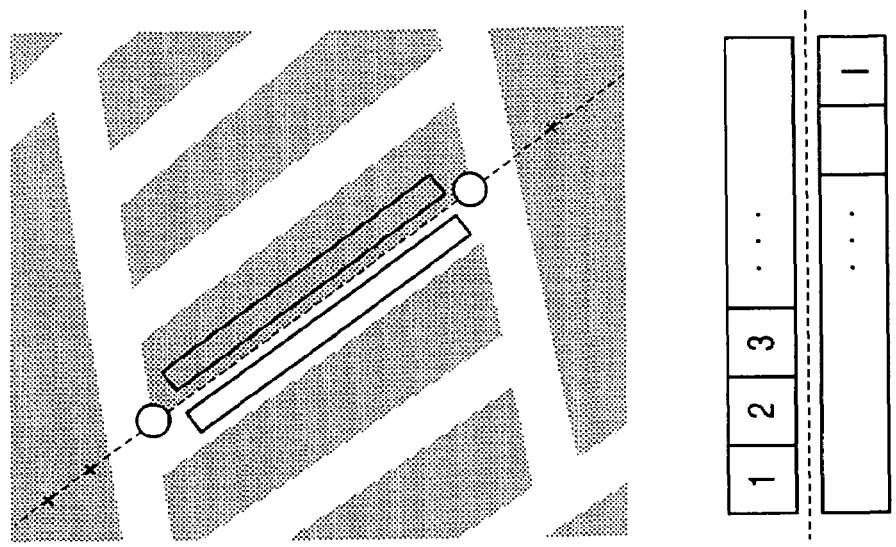
FIG. 10 is a typical view showing a method for acquiring the straight line correspondence by the dynamic programming in the straight-line correspondence detecting section.

The data series representing the image features near the straight line is obtained by calculating the image feature such as mean brightness for each minute area in a row of minute areas near the straight line, and arranging the image features in the order of minute areas, as shown in FIG. 10. By comparing the data series between the straight lines detected in the images photographed by two image pickup devices, it is possible to detect whether or not the straight lines have the correspondence.

Figure 11:
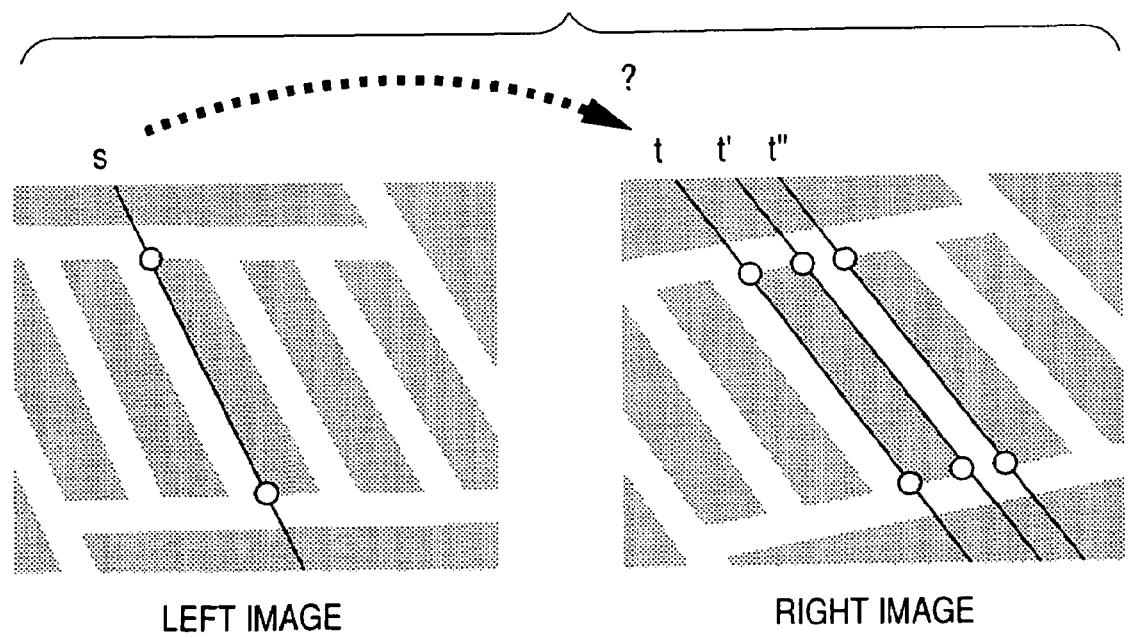
FIG. 11 is a typical view showing an instance where the straight line correspondence is not uniquely obtained from the image features.

Now consider an instance of finding a set of corresponding lines between the straight line s detected in an image (left image) output from a left image pickup device, and a plurality of straight lines detected in an image (right image) output from a right image pickup device, as shown in FIG. 11. When two straight lines t and t' are detected in the right image (assuming that t" is not detected), an image feature pattern near the straight line s is acquired in a neighboring area of FIG. 10, and similarly the image feature patterns near the straight lines t and t' are acquired. Thereby, the straight lines s and t having the same order of light and shade have very close image feature patterns, while the straight lines s and t' having different order of light and shade have different image feature patterns. Thereby, it will be found that the straight lines s and t are the corresponding lines in this case. However, when three straight lines t, t' and t" are detected, it may not be discriminated whether the straight line corresponding to s is t or t", because the image feature patterns near t and t" are the same. Since this situation is often seen in the scene having a repetitive pattern such as a crosswalk, an effective corresponding line detecting method is needed for the repetitive pattern.

To resolve the drawback in detecting the correspondence, a method for detecting the correspondence based on a geometrical relation with a plurality of surrounding straight lines, rather than simply comparing the information of two straight lines, is introduced.

More specifically, it is determined whether or not two straight lines to be compared correspond to each other, employing information indicating a positional relation between an intersection and surrounding straight lines (called an intersection pattern).

The principle is based on the fact that the geometrical relation between the straight lines such as the intersection pattern is preserved by the projective transformation of plane. That is, an intersection relation between lines is invariant between the left and right images, and a distance between intersections is invariant in respect of rough information such as an order of size, although the distances of the left and right images are not correctly equal due to the projective transformation. Accordingly, the information indicating the geometrical relation between the straight lines may be employed for comparison between the straight lines as the feature peculiar to the straight line.

Figure 12:
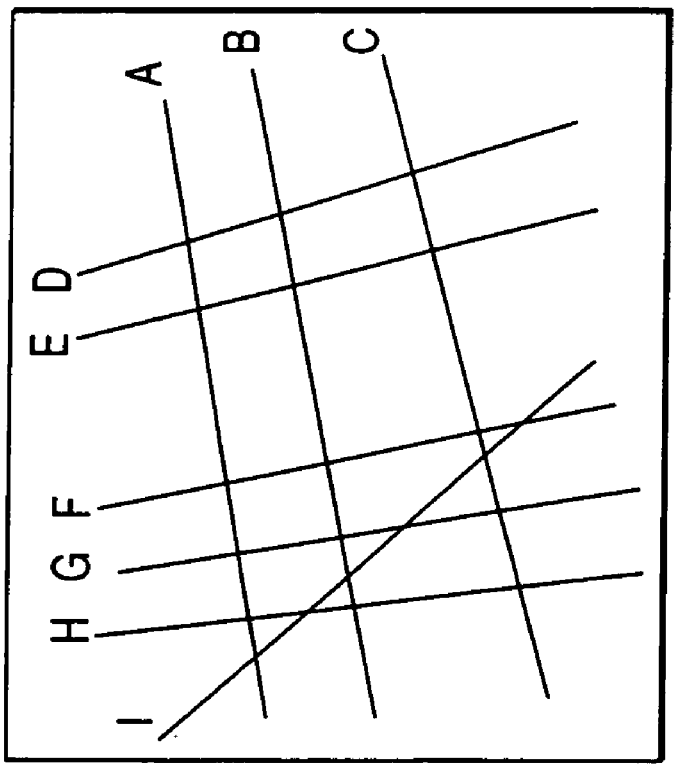
FIG. 12 is a typical view showing the exemplary straight lines acquired in the straight-line detecting section.
Figure 12:
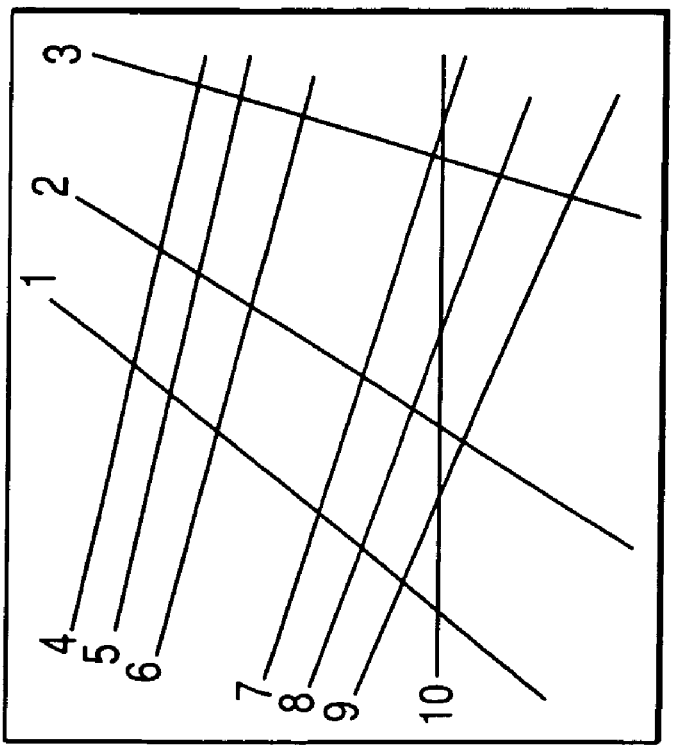
Figure 13:
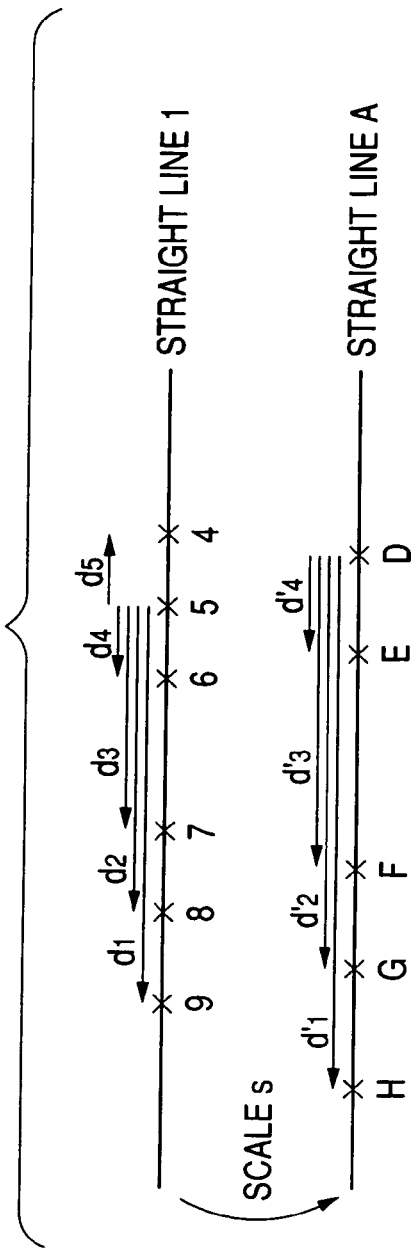
FIG. 13 is the typical diagrams for representing the geometrical relation between the straight lines as numerical values.
Figure 13:
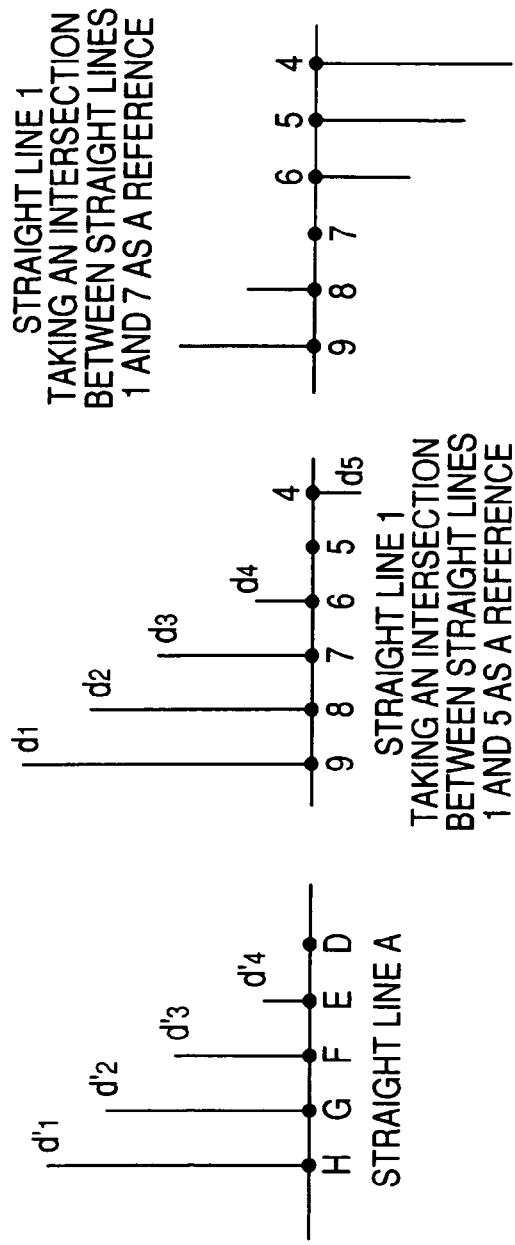

Referring to FIGS. 12 and 13, the specific description is given.

Suppose that the straight lines in the left and right images as shown in FIG. 12 are given, and labeled with 1, . . . , 10, A, . . . , I, respectively. For example, for the straight line 1 in the left image and the straight line A in the right image, a distance between intersections is represented, as shown at the upper part in FIG. 13. Suppose now that the straight line 5 and the straight line D are the corresponding lines in some way (as will be described later). If the distance to each intersection is plotted with taking the intersections between the straight lines 5, 1, and D, A, as references, an intersection pattern is obtained as shown on the lower left side and the lower central side in FIG. 13. This intersection pattern is quite similar, when the straight lines 5, D, which generate reference intersections, correctly correspond to each other, as shown in FIG. 13. Thereby, it can be found that detecting the straight lines 5, D as the corresponding lines is correct. On the contrary, in case that the straight lines, which generate reference intersections, incorrectly correspond to each other, for example, in case that the intersection pattern of the straight line 1 that is acquired with taking an intersection between the straight lines 1 and 7 as a reference (on the lower right side in FIG. 13), what is different from the intersection pattern of the straight line A with taking the intersection between the straight lines A and D as the reference is obtained. Hence, there is a higher error possibility in determining the straight lines 7, D as the corresponding lines than determining the straight lines 5, D as the corresponding lines. By comparison between the intersection patterns, the corresponding lines are determined correctly.

A specific method for comparing the intersection patterns, for example, in an instance as shown on the lower side in FIG. 13, if the data of the intersection patterns of the straight lines A and 1 have the same length, or can be made the same length (e.g., by ignoring d5), the numerical value indicating a data difference, such as the sum $\Sigma |d'_i - d_i|$ of absolute differences of each data, may be simply computed. Also, to compare the data of the intersection patterns having different lengths, the distance between the intersection patterns of the straight lines is acquired by making the DP matching as in the first embodiment to make the correspondence state clear.

As a method for deciding the corresponding lines, which are used as references, the image feature pattern may be employed as in the first embodiment, or any other suitable method may be employed.

Also, even if the corresponding lines are unknown in advance, the intersection patterns are compared for all the combinations, as described above, whereby it is possible to acquire the set of corresponding lines that are the most coincident, and thereby decide one-to-one the corresponding lines.

In calculating the distance between the intersection patterns by DP matching, the intersection patterns of two straight lines may be greatly different in the scale. To cope with this situation, a scale ratio of the intersection pattern (e.g., s=d'1/(d1+d5) in FIG. 13) is calculated before calculating the distance, and the intersection pattern data may be normalized by this scale ratio.

Herein, there is a method for associating the straight lines with each other, employing an evaluation function having a brightness gradient direction incorporated into line parameters as described in "A tracker for broken and closely-spaced lines, N. Chiba and T. Kanade, IEICE Trans. Vol. J81-D-II, No. 8, pp. 1744-1751, 1998.". However, information of two straight lines to be compared is only considered, and the geometrical relation with respect to a plurality of surrounding straight lines, which is taken into consideration in the embodiments of the invention, is overlooked. Thus, the correct correspondence between the straight lines in the repetitive image pattern as described above is not obtained in principle. Also, the brightness gradient direction is considered to be one direction from left to right of the straight line, or from right to left, and the image feature pattern in the neighboring area is not correctly reflected to the correspondence detection as in the first embodiment of this invention, resulting in a problem that the correct correspondence is not necessarily obtained. The embodiments of the invention provide the method for acquiring the correct correspondence between lines in any case not dealt with in the above "A tracker for broken and closely-spaced lines".

The transformation matrix calculating section 14 calculates the transformation matrix H, which is the image transformation parameter between the image pickup devices, from the set of corresponding lines detected in the straight-line correspondence detecting section 13. Finally, H acquired by solving the expression (15) is output as a result.

Modification Example

This invention is not limited to the above embodiments, but various variations or modifications may be made without departing from the spirit or scope of the invention.

The specific modification examples may be the same as those described in the first embodiment.

Third Embodiment

Figure 14:
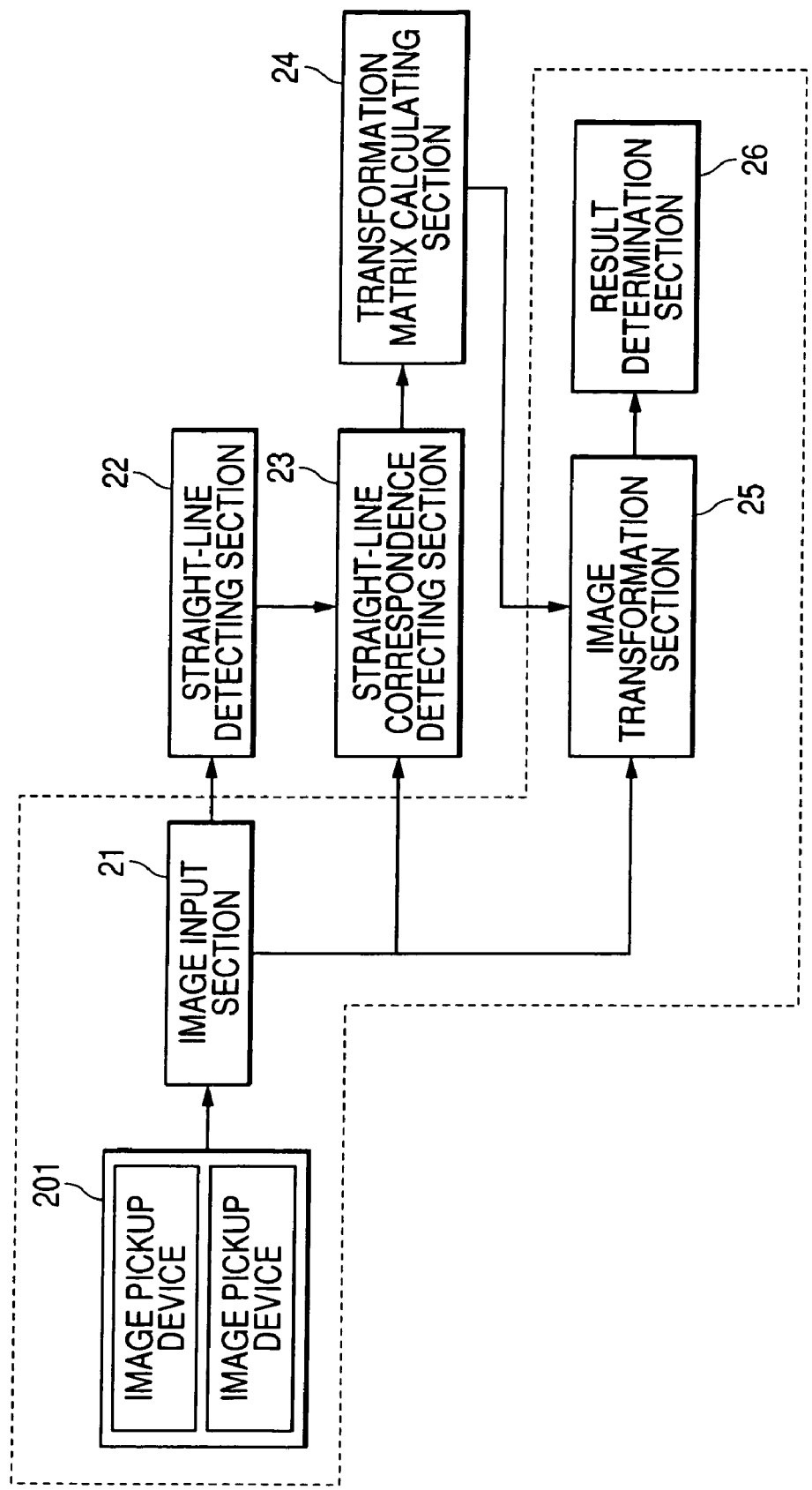
FIG. 14 is a schematic diagram showing a stereo image monitor according to the embodiment of the invention.

A stereo image monitor according to a third embodiment of the invention will be described with reference to FIGS. 14 and 15.

The stereo image monitor according to the third embodiment detects an object having a height with respect to a reference plane, such as an obstacle and an intruder, using the transformation matrix calculated by the stereo calibration apparatus as described above. FIG. 14 is a schematic view showing the stereo image monitor. In the figure, a portion surrounded by a dashed line perform the object detection process of the stereo image monitor and includes image pickup devices 201, an image input section 21, an image transformation section 25, and a result determination section 26. The image pickup devices 201 and the image input section 21 are same as those in the first and second embodiments. Also, cameras a and b of the image pickup devices 201 are installed to have a common field of view as shown in FIG. 2. The stereo image monitor further includes a straight-line detecting section 22, a straight-line correspondence detecting section 23, and a transformation matrix calculating section 24. Therefore, the stereo image monitor can perform the stereo calibration at any desired timing.

It is assumed that the transformation matrix H between the cameras a and b represents an image transformation from the camera a to the camera b and that such transformation matrix H has already been obtained. If image features in the neighborhood of arbitral X and X', which satisfy the equation (2), are compared, it can be determined whether or not X or X' is located on the reference plane. This determination will be described below in detail on the basis of a specific example.

Figure 15A:
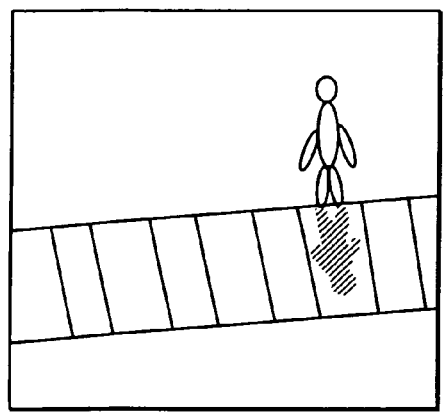
FIG. 15 is a view showing an object detection processing performed by the stereo image monitor according to the embodiment of the invention.
Figure 15B:
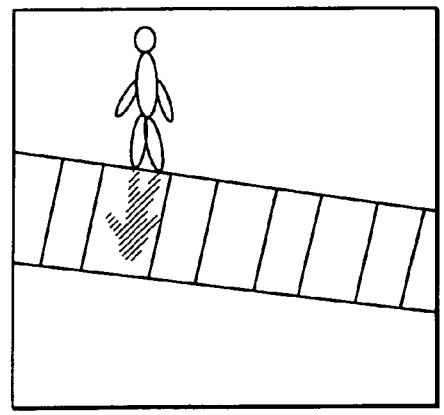
Figure 15C:
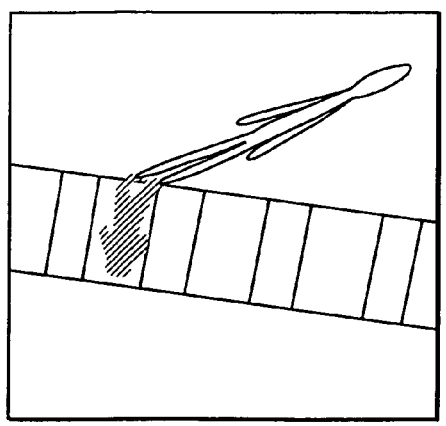

The image transformation section 25 transforms an image viewed from the camera a into an image viewed from the camera b using the transformation matrix H obtained in advance and the equation (2). This is because the equation (2) transforms a point on the reference plane in the image of the camera a into a coordinate in the image of the camera b where the same point is displayed. With reference to FIG. 15, more detailed description will be given. FIG. 15A shows an example of the image of the camera a. FIG. 15B shows an example of the image of the camera b. In both of FIGS. 15A and 15B, a crosswalk, a person, and his shadow are shown. FIG. 15C shows an image into which the image of the camera a is transformed. All points on the load surface, which serves as the reference plane, are transformed to be same as that in the image of the camera b (FIG. 15B). That is, the transformed crosswalk and person's shadow have the same position and the same shape as those in FIG. 15B. However, an object having a height with respect to the reference plane, that is, a portion where the person itself is shown does not satisfy the projective transformation expressed by the equation (2). Therefore, such portion is not transformed to be same as that in the image of the camera b.

Figure 15D:
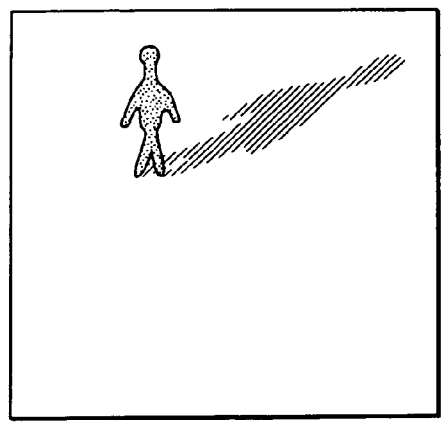

The result determination section 26 compares the transformed image (FIG. 15C) of the camera a by the image transformation section 25 with the image (FIG. 15b) of the camera b to determine whether or not the object to be detected is present in the image. The determination method may simply calculate difference between the FIGS. 15B and 15C. That is, when a difference image there between is generated, we can obtain an image shown in FIG. 15D. Therefore, taking noise into consideration, the result determination section 26 determines an object is present when a difference region being larger than a predetermined area is obtained. In FIG. 15D, only a portion where an object having a height with respect to the reference plane is extracted, and the shadow and patterns on the load surface are not detected. In other words, it is found that an object detection method using the transformation matrix can detect an object having a height without obtaining a three dimensional position of the object or a structure of the object precisely. This is an advantage of the object detection method according to the embodiments of the invention. The determination may be made on the basis of the simple difference process as described above. Alternatively, the determination may be made on the basis of a similarity such as a correlation value between corresponding regions of the two images as disclosed in JP-A-11-328365. It goes without saying that the object detection determination may be made using various other methods disclosed in JP-A-11-328365 and JP-A-2000-293693, which are incorporated herein by reference in those entirety.

With this invention, since the transformation matrix is automatically calculated from the set of corresponding lines between the images, and the image transformation parameters are acquired at high precision in a short time without operation of the coordinator, the manpower cost or operation time is more greatly reduced than conventionally needed, while avoiding the inconveniences, such as a malfunction in the stereo image monitor and sending the operator when the mounting of the image pickup device is changed. Accordingly, there is the significant effect in practice.

What is claimed is:

1. A stereo calibration apparatus for obtaining a transformation matrix, which is an image transformation parameter between a pair of image pickup devices for photographing a preset common area, the stereo calibration apparatus comprising:

an image input device to which a pair of images is input from the one pair of image pickup devices;

a straight-line detector detecting at least four straight lines from each image of the pair of images output from the image input device;

a straight-line correspondence detector detecting at least four sets of corresponding lines between the pair of images by using an image feature in a neighboring area of each of the four straight lines detected for each image of the pair of images; and a transformation matrix calculator calculating the transformation matrix by using the sets of corresponding lines, wherein the straight-line correspondence detector is configured to:

obtain data series regarding the image feature in the neighboring area for each of the four straight lines detected for each image of the pair of images;

obtain data differences between each of data in the data series of each of the four straight lines detected for a first image of the pair of images and each of data in the data series of each of the four straight lines detected for a second image of the pair of images;

obtain normalized distances by normalizing a weighted sum of the data differences using a sum of weighting factors; and determine one of the four straight lines in the first image of the pair of images and the corresponding one of the four straight lines in the second image of the pair of images having a smallest normalized distance as a pair of corresponding lines.

2. The stereo calibration apparatus according to claim 1, wherein the transformation matrix calculator calculates the transformation matrix in accordance with a linear expression by using the sets of corresponding lines and a projective transformation expression regarding the straight lines.

3. A stereo calibration method for obtaining a transformation matrix, which is an image transformation parameter between a pair of image pickup devices for photographing a preset common area, the method comprising:

inputting a pair of images from the image pickup devices;

detecting at least four straight lines from each image of the pair of images;

detecting at least four sets of corresponding lines between the pair of images by using an image feature in a neighboring area of each of the four straight lines detected for each image of the pair of images;

calculating the transformation matrix between the image pickup devices by using the sets of corresponding lines;

obtaining a data series regarding the image feature in the neighboring area for each of the four straight lines detected for each image of the pair of images;

obtaining data differences between each of data in the data series of each of the four straight lines detected for a first image of the pair of images and each of data in the data series of each of the four straight lines detected for a second image of the pair of images;

obtaining normalized distances by normalizing a weighted sum of the data differences using a sum of weighting factors; and determining one of the four straight lines in the first image of the pair of images and the corresponding one of the four straight lines in the second image of the pair of images having a smallest normalized distance as a pair of corresponding lines.

4. A computer-readable medium storing a computer program product tangibly embodying a program of instructions which is executed by a computer to perform a process for obtaining a transformation matrix, which is an image transformation parameter between a pair of image pickup devices for photographing a preset common area, the process comprising:

inputting a pair of images from the image pickup devices;

detecting at least four straight lines from each image of the pair of images;

detecting at least four sets of corresponding lines between the pair of images by using an image feature in a neighboring area of each of the four straight lines detected for each image of the pair of images;

calculating the transformation matrix between the image pickup devices by using the sets of corresponding lines;

obtaining a data series regarding the image feature in the neighboring area for each of the four straight lines detected for each image of the pair of images;

obtaining data differences between each of data in the data series of each of the four straight lines detected for a first image of the pair of images and each of data in the data series of each of the four straight lines detected for a second image of the pair of images;

obtaining normalized distances by normalizing a weighted sum of the data differences using a sum of weighting factors; and determining one of the four straight lines in the first image of the pair of images and the corresponding one of the four straight lines in the second image of the pair of images having a smallest normalized distance as a pair of corresponding lines.

5. A stereo image monitor for detecting an object, the stereo image monitor comprising:

a pair of image pickup devices configured to photograph a pair of images containing a common area;

a straight-line detector detecting at least four straight lines from each image of the pair of images;

a straight-line correspondence detector detecting at least four sets of corresponding lines between the pair of images by using an image feature in a neighboring area of each of the four straight lines detected for each image of the pair of images;

a transformation matrix calculator calculating the transformation matrix by using the four sets of corresponding lines; and a monitor transforming one image of the pair of images by using the transformation matrix to detect an object in the common area, wherein the straight-line correspondence detector is configured to:

obtain data series regarding the image feature in the neighboring area for each of the four straight lines detected for each image of the pair of images;

obtain data differences between each of data in the data series of each of the four straight lines detected for a first image of the pair of images and each of data in the data series of each of the four straight lines detected for a second image of the pair of images;

obtain normalized distances by normalizing a weighted sum of the data differences using a sum of weighting factors; and determine one of the four straight lines in the first image of the pair of images and the corresponding one of the four straight lines in the second image of the pair of images having a smallest normalized distance as a pair of corresponding lines.

6. A stereo image monitoring method for monitoring a common area, which photographed by a pair of image pickup devices, the method comprising:

inputting a pair of images from the image pickup devices;

detecting at least four straight lines from each image of the pair of images;

detecting at least four sets of corresponding lines between the pair of images using an image feature in a neighboring area of each of the four straight lines detected for each image of the pair of images;

calculating a transformation matrix between the image pickup devices by using the four sets of corresponding lines;

transforming one image of the pair of images by using the transformation matrix to detect an object in the common area;

obtaining a data series regarding the image feature in the neighboring area for each of the four straight lines detected for each image of the pair of images;

obtaining data differences between each of data in the data series of each of the four straight lines detected for a first image of the pair of images and each of data in the data series of each of the four straight lines detected for a second image of the pair of images;

obtaining normalized distances by normalizing a weighted sum of the data differences using a sum of weighting factors; and determining one of the four straight lines in the first image of the pair of images and the corresponding one of the four straight lines in the second image of the pair of images having a smallest normalized distance as a pair of corresponding lines.

7. A computer-readable medium storing a computer program product tangibly embodying a program of instructions which is executed by a computer to perform a process for monitoring a common area, which photographed by a pair of image pickup devices, the process comprising:

inputting a pair of images from the image pickup devices;

detecting at least four straight lines from each image of the pair of images;

detecting at least four sets of corresponding lines between the pair of images using an image feature in a neighboring area of each of the four straight lines detected for each image of the pair of images;

calculating a transformation matrix between the image pickup devices by using the four sets of corresponding lines;

transforming one image of the pair of images by using the transformation matrix to detect an object in the common area;

obtaining a data series regarding the image feature in the neighboring area for each of the four straight lines detected for each image of the pair of images;

obtaining data differences between each of data in the data series of each of the four straight lines detected for a first image of the pair of images and each of data in the data series of each of the four straight lines detected for a second image of the pair of images;

obtaining normalized distances by normalizing a weighted sum of the data differences using a sum of weighting factors; and determining one of the four straight lines in the first image of the pair of images and the corresponding one of the four straight lines in the second image of the pair of images having a smallest normalized distance as a pair of corresponding lines.

8. A stereo calibration apparatus for obtaining a transformation matrix, which is an image transformation parameter between a pair of image pickup devices for photographing a preset common area, the stereo calibration apparatus comprising:

an image input device to which a pair of images is input from the one pair of image pickup devices;

a straight-line detector detecting at least four straight lines from each image of the pair of images output from the image input device;

a straight-line correspondence detector detecting at least four sets of corresponding lines between the pair of images by using a geometrical relation among each of the four straight lines detected for each image of the pair of images; and a transformation matrix calculator calculating the transformation matrix by using the sets of corresponding lines, wherein the straight-line correspondence detector is configured to:

obtain data series regarding the image feature in the neighboring area for each of the four straight lines detected for each image of the pair of images;

obtain data differences between each of data in the data series of each of the four straight lines detected for a first image of the pair of images and each of data in the data series of each of the four straight lines detected for a second image of the pair of images;

obtain normalized distances by normalizing a weighted sum of the data differences using a sum of weighting factors; and determine one of the four straight lines in the first image of the pair of images and the corresponding one of the four straight lines in the second image of the pair of images having a smallest normalized distance as a pair of corresponding lines.

9. The stereo calibration apparatus according to claim 8, wherein the straight-line correspondence detector obtains the geometrical relation among each of the four straight lines detected for each image of the pair of images by using an intersection between one of the four straight lines in each image and the other of the four straight lines in each image.

10. The stereo calibration apparatus according to claim 8, wherein the straight-line correspondence detector uses an image feature in a neighboring area of the four straight lines and the geometrical relation to obtain the sets of corresponding lines.

11. A stereo calibration method for obtaining a transformation matrix, which is an image transformation parameter between a pair of image pickup devices for photographing a preset common area, the method comprising:

inputting a pair of images from the image pickup devices;

detecting at least four straight lines from each image of the pair of images;

detecting at least four sets of corresponding lines between the pair of images by using a geometrical relation among each of the four straight lines detected for each image of the pair of images;

calculating the transformation matrix between the image pickup devices by using the sets of corresponding lines;

obtaining a data series regarding the image feature in the neighboring area for each of the four straight lines detected for each image of the pair of images;

obtaining data differences between each of data in the data series of each of the four straight lines detected for a first image of the pair of images and each of data in the data series of each of the four straight lines detected for a second image of the pair of images;

obtaining normalized distances by normalizing a weighted sum of the data differences using a sum of weighting factors; and determining one of the four straight lines in the first image of the pair of images and the corresponding one of the four straight lines in the second image of the pair of images having a smallest normalized distance as a pair of corresponding lines.

12. A computer-readable medium storing a computer program product tangibly embodying a program of instructions causing a computer to perform a process for obtaining a transformation matrix, which is an image transformation parameter between a pair of image pickup devices for photographing a preset common area, the process comprising:
  inputting a pair of images from the image pickup devices;
  detecting at least four straight lines from each image of the pair of images;
  detecting at least four sets of corresponding lines between the pair of images by using a geometrical relation among each of the four straight lines detected for each image of the pair of images;
  calculating the transformation matrix between the image pickup devices by using the sets of corresponding lines;
  obtaining a data series regarding the image feature in the neighboring area for each of the four straight lines detected for each image of the pair of images;
  obtaining data differences between each of data in the data series of each of the four straight lines detected for a first image of the pair of images and each of data in the data series of each of the four straight lines detected for a second image of the pair of images;
  obtaining normalized distances by normalizing a weighted sum of the data differences using a sum of weighting factors; and
  determining one of the four straight lines in the first image of the pair of images and the corresponding one of the four straight lines in the second image of the pair of images having a smallest normalized distance as a pair of corresponding lines.

13. A stereo image monitor for detecting an object, the stereo image monitor comprising:
  a pair of image pickup devices configured to photograph images containing a common area;
  an image input device to which a pair of images is input from the image pickup devices;
  a straight-line detector detecting at least four straight lines from each image of the pair of images output from the image input device;
  a straight-line correspondence detector detecting at least four sets of corresponding lines between the pair of images by using a geometrical relation among each of the four straight lines detected for each image of the pair of images;
  a transformation matrix calculator calculating the transformation matrix by using the sets of corresponding lines; and
  a monitor transforming one image of the pair of images by using the transformation matrix to detect an object in the common area,
  wherein the straight-line correspondence detector is configured to:
  obtain data series regarding the image feature in the neighboring area for each of the four straight lines detected for each image of the pair of images;
  obtain data differences between each of data in the data series of each of the four straight lines detected for a first image of the pair of images and each of data in the data series of each of the four straight lines detected for a second image of the pair of images;
  obtain normalized distances by normalizing a weighted sum of the data differences using a sum of weighting factors; and
  determine one of the four straight lines in the first image of the pair of images and the corresponding one of the four straight lines in the second image of the pair of images having a smallest normalized distance as a pair of corresponding lines.

14. A stereo image monitoring method for monitoring a common area, which photographed by a pair of image pickup devices, the method comprising:
  inputting a pair of images from the image pickup devices;
  detecting at least four straight lines from each image of the pair of images;
  obtaining at least four sets of corresponding lines between the pair of images by using a geometrical relation among each of the four straight lines detected for each image of the pair of images;
  calculating a transformation matrix between the image pickup devices by using the four sets of corresponding lines;
  transforming one of the images of the pair of images by using the transformation matrix to detect an object in the common area;
  obtaining a data series regarding the image feature in the neighboring area for each of the four straight lines detected for each image of the pair of images;
  obtaining data differences between each of data in the data series of each of the four straight lines detected for a first image of the pair of images and each of data in the data series of each of the four straight lines detected for a second image of the pair of images;
  obtaining normalized distances by normalizing a weighted sum of the data differences using a sum of weighting factors; and
  determining one of the four straight lines in the first image of the pair of images and the corresponding one of the four straight lines in the second image of the pair of images having a smallest normalized distance as a pair of corresponding lines.

15. A computer-readable medium storing a computer program product tangibly embodying a program of instructions which is executed by a computer to perform a process for monitoring a common area, which photographed by a pair of image pickup devices, the process comprising:
  inputting a pair of images from the image pickup devices;
  detecting at least four straight lines from each image of the pair of images;
  obtaining at least four sets of corresponding lines between the pair of images by using a geometrical relation among each of the four straight lines detected for each image of the pair of images;
  calculating a transformation matrix between the image pickup devices by using the four sets of corresponding lines;
  transforming one of the images of the pair of images by using the transformation matrix to detect an object in the common area;
  obtaining a data series regarding the image feature in the neighboring area for each of the four straight lines detected for each image of the pair of images;
  obtaining data differences between each of data in the data series of each of the four straight lines detected for a first image of the pair of images and each of data in the data series of each of the four straight lines detected for a second image of the pair of images;
  obtaining normalized distances by normalizing a weighted sum of the data differences using a sum of weighting factors; and
  determining one of the four straight lines in the first image of the pair of images and the corresponding one of the four straight lines in the second image of the pair of images having a smallest normalized distance as a pair of corresponding lines.

* * * * *